US 6,579,353 B1

(12) United States Patent
DeLaMater et al.

(10) Patent No.: US 6,579,353 B1
(45) Date of Patent: Jun. 17, 2003

(54) PROTECTIVE COATING

(76) Inventors: Michael DeLaMater, 14534 SW. 58 Ter., Miami, FL (US) 33183; Donal Dallas Coleman, 14355 SW. 92 Ter., Miami, FL (US) 33186

( * ) Notice: Subject to any disclaimer, the term of this patent is extended or adjusted under 35 U.S.C. 154(b) by 0 days.

(21) Appl. No.: 10/008,561

(22) Filed: Nov. 13, 2001

(51) Int. Cl.⁷ ................................................. C04B 9/02
(52) U.S. Cl. ..................... 106/14.37; 106/2; 106/14.15; 106/14.42; 106/14.44; 427/384; 427/397
(58) Field of Search ....................... 106/2, 14.15, 14.37, 106/14.42, 14.44; 427/384, 397

(56) References Cited

U.S. PATENT DOCUMENTS

| | | | | |
|---|---|---|---|---|
| 3,700,013 A | * | 10/1972 | Coffey et al. ............ | 106/181.1 |
| 4,539,047 A | * | 9/1985 | Crockatt et al. ............ | 106/268 |
| 4,990,184 A | * | 2/1991 | Dotson et al. ............ | 106/14.11 |
| 5,143,949 A | * | 9/1992 | Grogan et al. ............... | 427/154 |
| 5,773,091 A | * | 6/1998 | Perlman et al. ............. | 427/154 |

OTHER PUBLICATIONS

Derwent Abstract No. 1986–057700, abstract of Hungary Patent Application No. 37640 (Jan. 1986).*

* cited by examiner

*Primary Examiner*—Anthony J. Green

(57) ABSTRACT

A transparent coating for protecting wood, brick, stucco, glass, steel and other materials from graffiti, paint, ink, mildew, rust and salt air. The protective coating of the present invention comprises: water, paraffin wax, a corrosion inhibitor, an organic amine, and an emulsifying agent. Preferably each gallon of the transparent protective coating contains: 2308.0 g water, 621.4 g paraffin wax, 15.8 g triethanolamine, 6.5 g diethanolamine, and 85.6 g glycerine monostearate. The present invention also comprises methods for preparing the protective coating and methods of protecting surfaces from being marred by graffiti and the like using these protective coatings.

15 Claims, 2 Drawing Sheets

TABLE 1

| INGREDIENTS | GRAMS |
|---|---|
| WATER | 2308.0 |
| PARAFFIN WAX | 621.4 |
| GLYCERINE MONOSTEARATE | 85.6 |
| TRIETHANOAMINE | 15.8 |
| DIETHANOLAMINE | 6.5 |

FIG. 2

PROTECTIVE COATING

BACKGROUND OF THE INVENTION

1. Field of the Invention

The present invention relates to a protective coating for use in connection with protecting wood, brick, stucco, glass, steel and other materials. The protective coating has particular utility in connection with protecting materials from graffiti, paint, ink, mildew, rust, and salt air.

2. Description of the Prior Art

The use of protective coatings is known in the prior art. For example, U.S. Pat. No. 4,693,909 to Ziegler et al. discloses a liquid polymer wax preservative for metal surfaces.

U.S. Pat. No. 4,241,141 to Dill discloses a removable barrier made from a as polymer solution for protecting painted surfaces from being permanently marked by permanent marking pens.

U.S. Pat. No. 5,417,714 to Gasmena discloses a clear hydrophobic coating that is durable, weather, chemical and heat resistant.

Lastly, U.S. Pat. No. 5,938,831 to Moy discloses a sealant composed of a volatile hydrocarbon solvent, linseed oil, varnish, and paraffin and aluminum stearate for protecting wood signs from weathering.

While the above-described devices fulfill their respective, particular objectives and requirements, the aforementioned patents do not describe a single protective coating that allows for protection of wood, brick, stucco, glass, steel and other materials from graffiti, paint, ink, mildew, rust, and salt air. The Dill patent provides for a removable sacrificial coating thereby requiring that the coating be reapplied after cleaning. The Moy patent provides for a protective coating with a volatile solvent. The Ziegler et al patent provides a coating for temporarily preserving metal surfaces. The Gasmena patent provides a durable, weather, chemical and heat resistant protective coating but is silent as to the resistance of such coating to graffiti, paint, ink, mildew, rust and salt air.

Therefore, a need exists for a new and improved protective coating which can be used to protect multiple surfaces from graffiti, paint, ink, mildew, rust, and salt air and permit easy of removal of graffiti, paint, ink, mildew, rust, and salt air there from. In this regard, the present invention substantially fulfills this need. In this respect, the protective coating according to the present invention substantially departs from the conventional concepts and designs of the prior art, and in doing so provides an apparatus primarily developed for the purpose of protection of wood, brick, stucco, glass, steel and other materials from graffiti, paint, ink, mildew, rust, and salt air.

SUMMARY OF THE INVENTION

In view of the foregoing disadvantages inherent in the known types of protective coatings now present in the prior art, the present invention provides an improved protective coating, and overcomes the above-mentioned disadvantages and drawbacks of the prior art. As such, the general purpose of the present invention, which will be described subsequently in greater detail, is to provide a new and improved protective coating and methods of making and using the protective coating which has all the advantages of the prior art mentioned heretofore and many novel features that result in a protective which is not anticipated, rendered obvious, suggested, or even implied by the prior art, either alone or in any combination thereof.

To attain this, the present invention essentially comprises a transparent coating for protecting wood, brick, stucco, glass, steel and other materials from graffiti comprising: water, paraffin wax, a corrosion inhibitor, an organic amine, and an emulsifying agent. The corrosion inhibitor is preferably triethanolamine. The organic amine is preferably diethanolamine. The emulsifying agent is preferably glycerine monostearate. Preferably each gallon of the transparent protective coating contains: approximately 2308.0 g water, approximately 621.4 g paraffin wax, approximately 15.8 g triethanolamine, approximately 6.5 g diethanolamine and approximately 85.6 g glycerine monostearate. More preferably each gallon of the transparent protective coating contains: 2308.0 g water, 621.4 g paraffin wax, 15.8 g triethanolamine, 6.5 g diethanolamine and 85.6 g glycerine monostearate.

The present invention also comprises methods for preparing the abovementioned transparent protective coatings, the method comprising the steps of: heating water to about 140° F. and mixing the solution continuously at 350 r.p.m.; adding melted paraffin wax; adding an emulsifying agent; mixing until the mixture has creamy texture; adding a corrosion inhibitor; adding an organic amine; and mixing until the material comes to room temperature.

The present invention also comprises methods of protecting surfaces from being marred by graffiti, paint, ink, mildew, rust, and salt air using any of the abovementioned transparent protective coatings, the method comprising: coating the surface to be protected with the transparent coating; and allowing the coating to dry on the surface to be protected.

There has thus been outlined, rather broadly, the more important features of the invention in order that the detailed description thereof that follows may be better understood and in order that the present contribution to the art may be better appreciated.

The invention may also include variations of the protective coating formula specific for the material to be coated or the site to be protected. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofaras they do not depart from the spirit and scope of the present invention.

It is therefore an object of the present invention to provide a new and improved protective coating that has all of the advantages of the prior art protective coatings and none of the disadvantages.

It is another object of the present invention to provide a new and improved protective coating which may be easily and efficiently manufactured and marketed.

It is further object of the present invention to provide a new and improved protective coating which is of a durable and reliable construction.

An even further object of the present invention is to provide a new and improved protective coating which is susceptible of a low cost of manufacture with regard to both materials and labor, and which accordingly is then susceptible of low prices of sale to the consuming public, thereby making such protective coating economically available to the buying public.

Still another object of the present invention is to provide a new protective coating which provides in the apparatuses and methods of the prior art some of the advantages thereof, while simultaneously overcoming some of the disadvantages normally associated therewith.

Even still another object of the present invention is to provide a protective coating for wood, stucco, brick, glass, steel and other materials that is clear after a cure time of approximately 24 hours.

Still yet another object of the present invention is to provide a protective coating to which graffiti, paint, ink, mildew, water rust or salt air will not bond.

Yet another object of the present invention is to provide a protective coating that can be cleaned off with water pressure and does not require harsh cleaners.

Still even another object of the present invention is to provide a protective coating that can be applied with an airless spray unit, a hand roller or other conventional painting equipment.

Still another object of the present invention is to provide a protective coating that lacks any petroleum-based solvents or related materials.

Yet another is an object of the present invention to provide a new and improved method of making a protective coating for wood, stucco, brick, glass, steel and other materials.

Lastly, it is an object of the present invention to provide a new and improved method of protecting wood, stucco, brick, glass, steel and other materials by applying a clear protective coating that is graffiti, paint, ink, mildew, rust and salt air resistant.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a table of the preferred composition of the protective coating of the present invention.

DESCRIPTION OF THE PREFERRED EMBODIMENT

Figure 1:
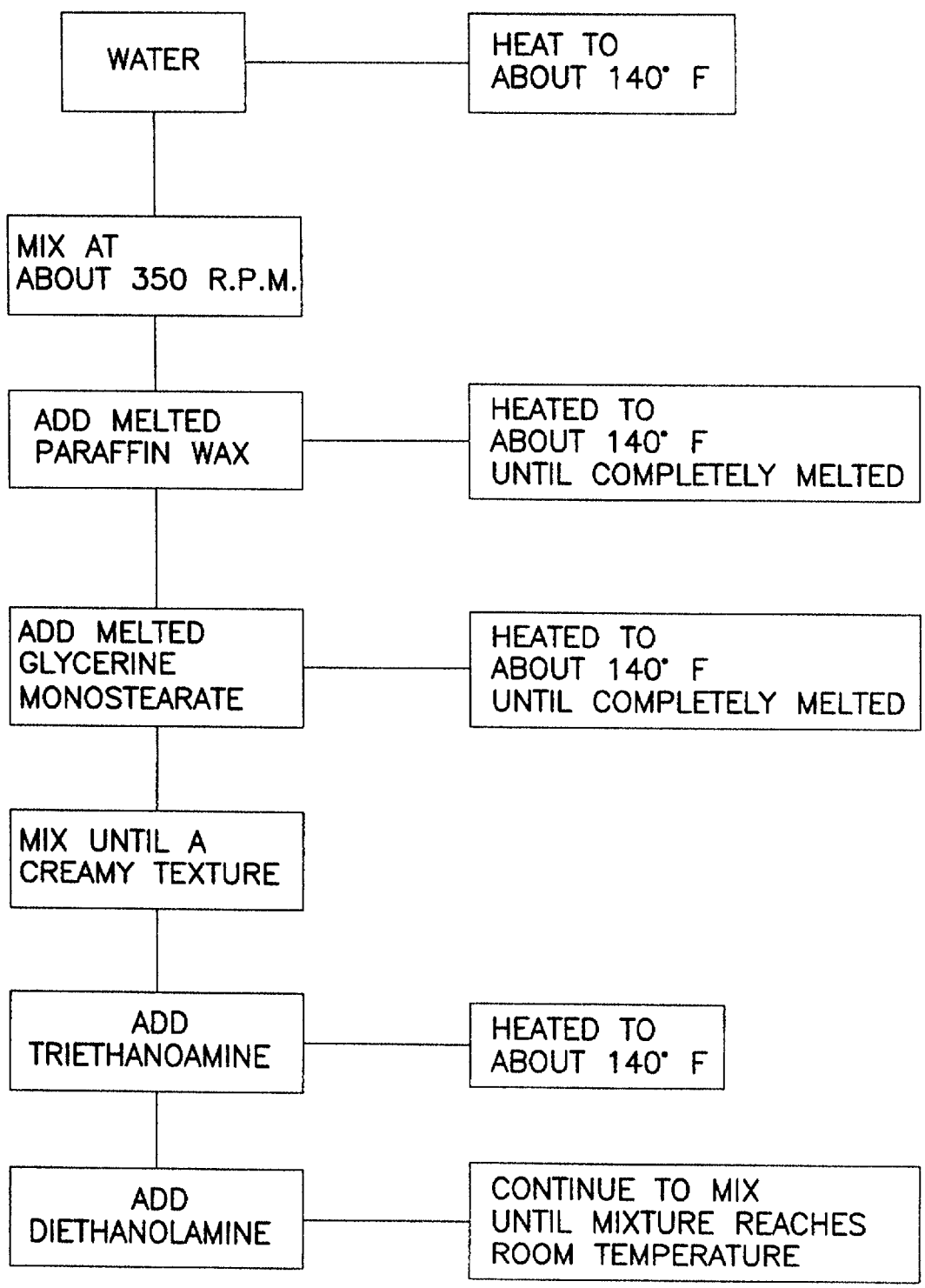
FIG. 1 is a flow diagram of the preferred method of making the protective coating in accordance with the principles of the present invention.

Referring now to the drawings, particularly FIG. 1, a preferred embodiment of the process for making the protecting coating of the present invention is shown.

In FIG. 1, a new and improved protective coating of the present invention for protecting wood, brick, stucco, glass, steel and other materials from graffiti, paint, ink, mildew, rust, and salt air is illustrated and will be described. In particular, water is heated to about 140° F. and placed in a mixer revolving at approximately 350 revolutions per minute (r.p.m.) so as not to add air or to foam the mixture but permit the efficient mixing of the individual components of the composition. Paraffin wax that has been heated to about 140° F. until completely melted is then added to the water and thoroughly blended. Thirdly, an emulsifying agent, preferably glycerine monostearate that has been heated to about 140° F. until completely melted, is added to the composition. The composition is blended until is has a creamy uniform texture. A corrosion inhibitor, preferably triethanolamine that has been heated to about 140° F., is added followed by an organic amine, preferably diethanolamine. The composition is then permitted to continue mixing until the material reaches room temperature. The final mixture will be milk white in color and should be stored at 50–120° F.

The protective coating of the present invention comprises water, paraffin wax, an emulsifying agent, a corrosion inhibitor and an organic amine. Any suitable emulsifying agent may be used, although glycerin monostearate is preferred. Any suitable corrosion inhibitor may be used in the protective coating. Preferably the corrosion inhibitor is triethanolamine. Triethanolamine additionally functions as a titanium chelate, surfactant and cross-linking agent. Any suitable organic amine may be used in the protective coating. Preferably the organic amine is diethanolamine. Diethanolamine functions as a liquid detergent for emulsion paints.

Each gallon of the protective coating of the present invention preferably comprises: approximately 2308.0 g water, approximately 621.4 g paraffin wax, approximately 15.8 g triethanolamine, approximately 6.5 g diethanolamine and approximately 85.6 g glycerine monostearate. More preferably each gallon of the transparent protective coating contains: 2308.0 g water, 621.4 g paraffin wax, 15.8 g triethanolamine, 6.5 g diethanolamine and 85.6 g glycerine monostearate, as described in FIG. 2.

Numerous variations and modifications of the protective coating are envisioned. The viscosity of the protective coating may be modified by adding water to the mixture. The viscosity may be modified depending upon conditions such as the equipment used to apply the coating, the surface to be coated, weather conditions. The protective coating may be made in quantities other than one gallon. Any additives suitable to a particular application of the in individual user are also envisioned.

The present invention also encompasses methods of using the protective coating of the present invention to protect surfaces such as wood, brick, stucco, glass, steel and other materials from graffiti, paint, ink, mildew, rust or salt air. The surface to which the protective coating is to be applied is first pressure cleaned. The protective coating of the present invention is then applied using conventional painting techniques such as an airless spray unit or a hand roller. The present invention has that advantages of lacking any petroleum-based solvents or related materials so as to have fairly low emission levels during the drying period. After a cure time of approximately 24 hours, the protective coating creates a surface that resists graffiti, paint, ink, mildew, rust and salt air. Further the protected surface may be cleaned with pressure, avoiding the use of harsh chemicals or the need to reapply the protective coating after cleaning.

While a preferred embodiment of the protective coating has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any corrosion inhibitor may be used instead of the triethanolamine described. Any organic amine may be used instead of diethanolamine and any emulsifying agent may be used instead of glycerin monostearate. It should appreciated that the protective coating herein described is also suitable for protecting a wide variety of materials from a wide variety of different damaging agents.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A transparent coating composition for protecting wood, brick, stucco, glass and steel from graffiti, paint, ink, mildew, rust, and salt air comprising: water in an amount of approximately 76% by weight of said composition, paraffin wax in an amount of approximately 20.5% by weight of said composition, a corrosion inhibitor in an amount of approximately 0.5% by weight of said composition, an organic amine in an amount of approximately 0.2% by weight of said composition, and an emulsifying agent in an amount of approximately 2.8% by weight of said composition.

2. The transparent coating composition of claim 1 wherein said corrosion inhibitor is triethanolamine.

3. The transparent coating composition of claim 1 wherein said organic amine is diethanolamine.

4. The transparent coating composition of claim 1 wherein said emulsifying agent is glycerine monostearate.

5. The transparent coating composition of claim 1 wherein said corrosion inhibitor is triethanolamine, said organic amine is diethanolamine and said emulsifying agent is glycerine monostearate.

6. The transparent coating composition of claim 5, wherein 1 gallon of the transparent coating comprises: approximately 2308.0 g water, approximately 621.4 g paraffin wax, approximately 15.8 g triethanolamine, approximately 6.5 g diethanolamine and approximately 85.6 g glycerine monostearate.

7. The transparent coating composition of claim 6, wherein 1 gallon of the transparent coating composition comprises: 2308.0 g water, 621.4 g paraffin wax, 15.8 g triethanolamine, 6.5 g diethanolarnine and 85.6 g glycerine monostearate.

8. A method for preparing the transparent coating composition of claim 1, the method comprising the steps of:

heating water to about 140° F. and mixing continuously at 350 r.p.m.;

adding melted paraffin wax;

adding an emulsifying agent;

mixing until said composition has creamy texture;

adding a corrosion inhibitor;

adding an organic amine; and mixing until said composition comes to room temperature.

9. The method of claim 8 wherein said corrosion inhibitor is triethanolamine.

10. The method of claim 8 wherein said organic amine is diethanolamine.

11. The method of claim 8 wherein said emulsifying agent is melted glycerine monostearate.

12. The method of claim 8 wherein said corrosion inhibitor is triethanolamine, said organic amine is diethanolamine and said emulsifying agent is melted glycerine monostearate.

13. The method of claim 12 wherein 1 gallon of the transparent coating composition comprises: approximately 2308.0 g water, approximately 621.4 g paraffin wax, approximately 15.8 g triethanolamine, approximately 6.5 g diethanolamine and approximately 85.6 g glycerine monostearate.

14. The method of claim 12 wherein 1 gallon of the transparent coating composition comprises: 2308.0 g water, 621.4 g paraffin wax, 15.8 g triethanolamine, 6.5 g diethanolamine and 85.6 g glycerine monostearate.

15. A method of protecting surfaces from graffiti, paint, ink, mildew, rust, and salt air using the transparent coating composition of any one of claims 1–7, the method comprising:

coating the surface to be protected with said transparent coating composition; and allowing said composition to dry on the surface to be protected.

* * * * *